US010075268B1

United States Patent
Pawar et al.

(10) Patent No.: US 10,075,268 B1
(45) Date of Patent: Sep. 11, 2018

(54) SYSTEMS AND METHODS FOR PERFORMING CARRIER AGGREGATION FOR A WIRELESS DEVICE PROXIMATE TO AN ANTENNA SYSTEM

(71) Applicant: Sprint Spectrum LP, Overland Park, KS (US)

(72) Inventors: Hemanth Pawar, Brambleton, VA (US); Krishna Sitaram, Chantilly, VA (US); Pratik Kothari, Sterling, VA (US); Chunmei Liu, Great Falls, VA (US)

(73) Assignee: Sprint Spectrum L.P., Overland Park, KS (US)

( * ) Notice: Subject to any disclaimer, the term of this patent is extended or adjusted under 35 U.S.C. 154(b) by 212 days.

(21) Appl. No.: 15/041,373

(22) Filed: Feb. 11, 2016

(51) Int. Cl.
*H04W 4/00* (2018.01)
*H04L 5/00* (2006.01)
*H04W 72/04* (2009.01)

(52) U.S. Cl.
CPC ......... *H04L 5/0041* (2013.01); *H04W 72/042* (2013.01)

(58) Field of Classification Search
CPC ..... H04L 5/003; H04L 5/0091; H04L 5/0094; H04L 5/0098; H04L 5/023
See application file for complete search history.

(56) References Cited

U.S. PATENT DOCUMENTS

| 8,472,868 | B2* | 6/2013 | Mu | H04B 7/15521 370/279 |
| 9,622,174 | B2* | 4/2017 | Kim | H04L 5/001 |
| 2012/0087257 | A1* | 4/2012 | Larsson | H04L 5/001 370/252 |
| 2013/0322260 | A1* | 12/2013 | Yao | H04W 72/082 370/241 |
| 2014/0269502 | A1 | 9/2014 | Forenza et al. | |
| 2015/0141027 | A1* | 5/2015 | Tsui | H04W 52/243 455/452.1 |

* cited by examiner

*Primary Examiner* — Alvin Zhu

(57) ABSTRACT

Systems and methods are described for performing carrier aggregation for a wireless device proximate to an antenna system. An uplink signal may be received at an access node from a wireless device in communication with the access node. It may be detected that the wireless device is proximate to an antenna system, wherein the antenna system does not comprise the access node. It may be then determined that carrier aggregation should be triggered for the wireless device based on the detecting. And carrier aggregation may be performed for the wireless device by transmitting data from the access node to the wireless device over a primary carrier and a secondary carrier.

18 Claims, 6 Drawing Sheets

US 10,075,268 B1

SYSTEMS AND METHODS FOR PERFORMING CARRIER AGGREGATION FOR A WIRELESS DEVICE PROXIMATE TO AN ANTENNA SYSTEM

TECHNICAL BACKGROUND

Telecommunication systems, such as cellular networks or other wireless networks, rely on multiple network elements to provide reliable services. For example, multiple access points may be located within close proximity to one another. In some configurations, an antenna system (e.g., a distributed antenna system (DAS)) may be deployed to provide wireless services over a geographic area. However, a wireless device proximate to the antenna system that is in communication with a separate access node may interfere with the communications of the antenna system. It may be beneficial for a system to mitigate interference experienced at the antenna system caused by proximate wireless devices.

OVERVIEW

Systems and methods are described for performing carrier aggregation for a wireless device proximate to an antenna system. An uplink signal may be received at an access node from a wireless device in communication with the access node. It may be detected that the wireless device is proximate to an antenna system, wherein the antenna system does not comprise the access node. It may be then determined that carrier aggregation should be triggered for the wireless device based on the detecting. And carrier aggregation may be performed for the wireless device by transmitting data from the access node to the wireless device over a primary carrier and a secondary carrier.

DETAILED DESCRIPTION

Systems and methods are described for performing carrier aggregation for a wireless device proximate to an antenna system. For instance, an antenna system, such as a distributed antenna system, may be deployed to provide wireless services to a geographic area. In some embodiments, it may be a given that wireless devices served by the antenna system (e.g., participating wireless devices) are within a predetermined geographic area. In this example, the uplink transmit power for the participating wireless devices may be controlled in view of the known locations for the antennas distributed across the geographic region.

A wireless device proximate to the antenna system that is served by a separate access node (e.g., non-participating wireless device) may interfere with communication between the antenna system and the participating wireless devices. For example, the uplink transmit power for the non-participating wireless device may not be controlled in the manner that the uplink transmit power for the participating wireless devices are controlled. Accordingly, the separate access node may perform carrier aggregation for the non-participating wireless devices, for instance to manage the carrier used by the wireless device for uplink transmissions. In some embodiments, based on the configuration of the carrier aggregation, the non-participating wireless device may change the carrier used to transmit uplink signals, and the interference at the antenna system may be mitigated.

Figure 1:
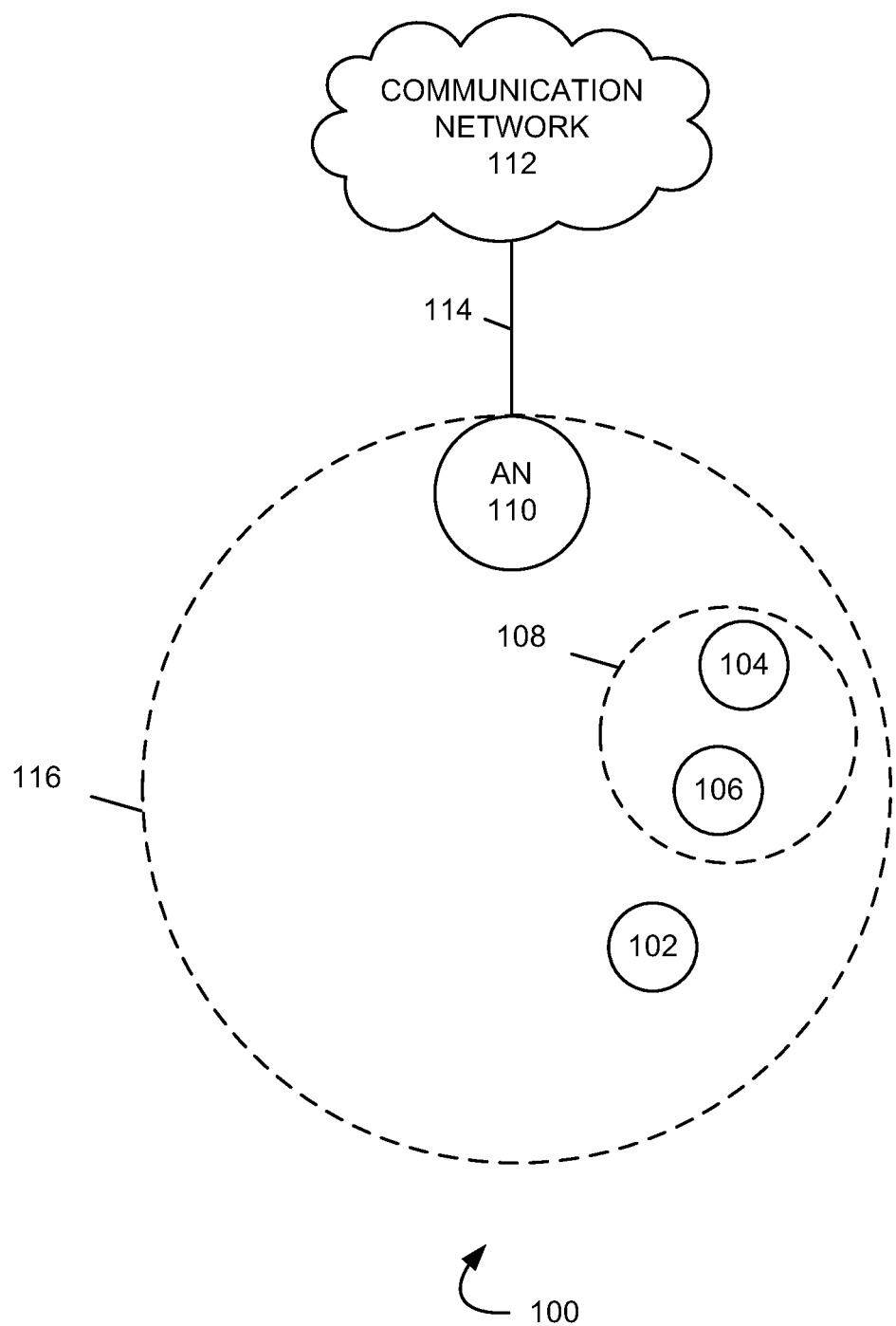
FIG. 1 illustrates an exemplary communication system to perform carrier aggregation for a wireless device proximate to an antenna system.

FIG. 1 illustrates an exemplary communication system 100 to perform carrier aggregation for a wireless device proximate to an antenna system comprising wireless devices 102, 104, and 106, antenna system 108, access node 110, communication network 112, communication link 114, and coverage area 116. Other network elements may be present in the communication system 100 to facilitate communication but are omitted for clarity, such as controller nodes, base stations, base station controllers, gateways, mobile switching centers, dispatch application processors, and location registers such as a home location register or visitor location register. Furthermore, other network elements may be present to facilitate communication between antenna system 108, access node 110, and communication network 112 which are omitted for clarity, including additional processing nodes, routers, gateways, and physical and/or wireless data links for carrying data among the various network elements.

Wireless devices 102, 104, and 106 can be any device configured to communicate over communication system 100 using a wireless communication link. For example, wireless devices 102, 104, and 106 can include a cell phone, a smart phone, a computing platform such as a laptop, palmtop, or a tablet, a personal digital assistant, relay communication device, or an internet access device, and combinations thereof. It is noted that while three wireless devices are illustrated in FIG. 1 as being in communication with the depicted access node and antenna system, any number of wireless devices can be implemented.

Antenna system 108 may comprise any configuration of antennas or access points configured to provide wireless devices (e.g., wireless devices 104 and 106) access to a communication network (e.g., communication network 112) within a geographic area. For example, antenna system 108 may comprise a distributed antenna system (DAS) or any other suitable configured antenna system or array distributed across a predetermined geographic space. In some embodiments, antenna system 108 may comprise one or more filters (e.g., low pass filters), one or more repeaters, one or more amplifiers, and any other suitable components.

Access node 110 is a network node capable of providing wireless communication to wireless device 102, and can be, for example, a base transceiver station, a radio base station, an eNodeB device, a small cell (i.e. pico node, femto node, and the like), or any other suitable network element. Access node 110 may communicate with communication network 112 over communication link 114. Although only one access nodes is illustrated in FIG. 1, wireless device 102 (and other wireless device not depicted) can be in communication with a plurality of access nodes and/or small cells. The plurality of access nodes and/or small cells can be associated with different networks and can support different communication protocols and radio access technologies.

Communication network 112 can be a wired and/or wireless communication network, and can comprise processing nodes, routers, gateways, and physical and/or wireless data links for carrying data among various network elements, including combinations thereof, and can include a local area network, a wide area network, and an internetwork (including the Internet). Communication network 112 can be capable of carrying voice information and other information, for example, to support communications by a wireless device such as wireless device 102. Wireless network protocols may comprise code division multiple access (CDMA) 1xRTT, Global System for Mobile communications (GSM), Universal Mobile Telecommunications System (UMTS), High-Speed Packet Access (HSPA), Evolution Data Optimized (EV-DO), EV-DO rev. A, and Third Generation Partnership Project Long Term Evolution (3GPP LTE). Wired network protocols that may be utilized by communication network 112 comprise Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM). Communication network 112 may also comprise a wireless network, including base stations, wireless communication nodes, telephony switches, internet routers, network gateways, computer systems, communication links, or some other type of communication equipment, and combinations thereof.

Communication link 114 can be a wired or wireless communication link. Wired communication links can comprise, for example, twisted pair cable, coaxial cable or fiber optic cable, or combinations thereof. Wireless communication links can comprise a radio frequency, microwave, infrared, or other similar signal, and can use a suitable communication protocol, for example, GSM, CDMA, UMTS, HSPA, EV-DO, or 3GPP LTE, or combinations thereof. Other wireless protocols can also be used.

In operation, access node 110 may establish communication with wireless device 102 such that access node 110 provides the wireless device access to a communication network (e.g., communication network 112). Similarly, antenna system 108 may establish communication with wireless devices 104 and 106 such that antenna system 108 provides the wireless devices access to a communication network (e.g., communication network 112).

In an embodiment, system 100 may use a plurality of carriers in order to provide wireless communication services. For example, a plurality of carriers that comprise bandwidth for wireless communications (e.g., one or more carriers over a 1.25 GHz spectrum, one or more carriers over a 1900 Mhz spectrum, one or more carriers over a 800 Mhz spectrum, and the like) may include a plurality of channels (e.g., 5 Mhz channels, 10 Mhz channels, 15 Mhz channels, and the like) that may further be divided into subcarriers. In an embodiment, a frequency band may comprise a carrier, a channel, a subcarrier, a plurality of any of these, or any other suitable frequency band.

In an embodiment, access node 110 may comprise coverage area 116. For example, a coverage area may be the area around an access node or cell where a wireless device may detect wireless signals transmitted from the node or cell (e.g., detect signals at a signal level above a threshold). Antenna system 108 may overlap with coverage area 116.

In an embodiment, carrier aggregation may also be implemented by the system 100. For example, access node 110 may communicate with wireless device 102 using carrier aggregation such that the data rate (or throughput) for the communication is greater than the data rate for single carrier communication. In an embodiment, access node 110 may communicate with wireless device 102 using a primary carrier (e.g., a first frequency band) and one or more secondary carriers (e.g., one or more secondary frequency bands). For example, a primary channel (e.g., 5 or 10 Mhz channel) and one or more secondary channels may be allocated for communication between access node 110 and wireless device 102, where each channel may comprise a component carrier for the communication.

When using carrier aggregation, the available spectrum for communication, and thus the data rate or throughput, may increase directly with the number of secondary component carriers. The communication may leverage one or more of intra-band carrier aggregation with contiguous component carriers, intra-band carrier aggregation with non-contiguous component carriers, or inter-band carrier aggregation. In some embodiments, wireless device 102 may transmit uplink communications on the primary component carrier, but not on the secondary component carrier. In other embodiments, wireless device 102 may transmit uplink communications on both the primary and secondary component carriers.

In an embodiment, communication between wireless device 102 and access node 110 may cause interference over antenna system 108. In some embodiments, it may be a given that wireless devices 104 and 106, wireless devices served by the antenna system (e.g., participating wireless devices), are within a predetermined geographic area (e.g., a predetermined geographic area covered by antenna system 108). In this example, the uplink transmit power for the participating wireless devices (e.g., wireless device 104 and 106) may be controlled in view of the known locations for the antennas distributed across the geographic region. For instance, the participating wireless device may be instructed to use an uplink transmit power that is lower than the power used for normal communication with an access node.

Communication between access node 110 and wireless device 102 (e.g., non-participating wireless device) may interfere with communication between antenna system 108 and the participating wireless devices. For example, the uplink transmit power for wireless device 102 may not be controlled in the manner that the uplink transmit power for the participating wireless devices are controlled, and thus uplink transmission from wireless device 102 may overload antenna system 108. Accordingly, it may be beneficial for a system to mitigate interference experienced at an antenna system caused by proximate wireless devices.

Figure 2:
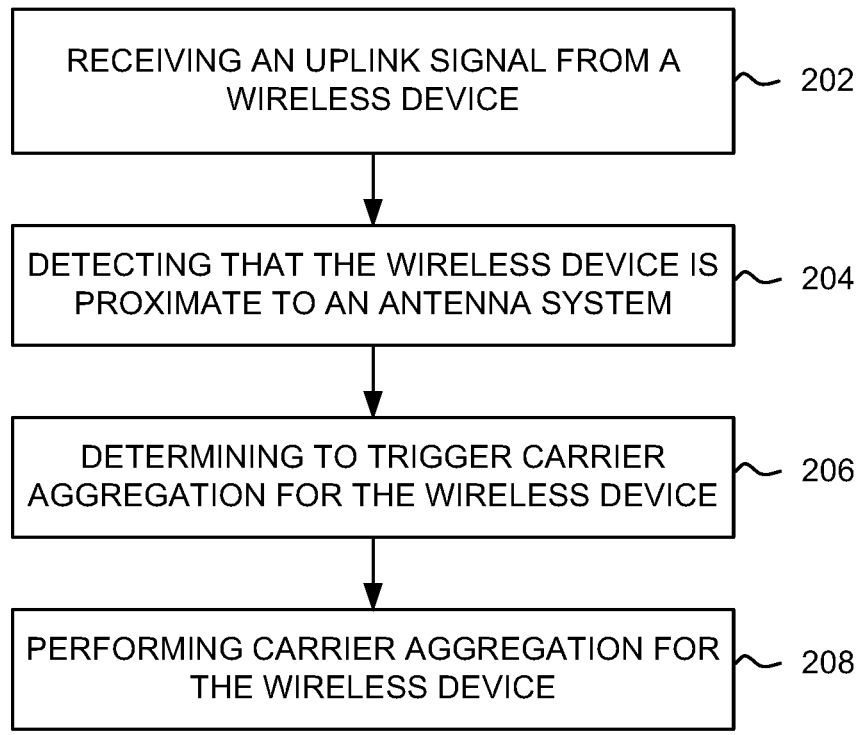
FIG. 2 illustrates an exemplary method for performing carrier aggregation for a wireless device proximate to an antenna system.

FIG. 2 illustrates an exemplary method for performing carrier aggregation for a wireless device proximate to an antenna system according to an embodiment. The method will be discussed with reference to the exemplary communication system 100 illustrated in FIG. 1, however, the method can be implemented with any suitable communication system.

Referring to FIG. 2, at step 202, an uplink signal may be received at an access node from a wireless device in communication with the access node. For example, access node 110 may be in communication with wireless device 102. Wireless device 102 may receive downlink transmissions from access node 110 and access node 110 may receive uplink transmissions from wireless device 102.

At step 204, it may be detected that the wireless device is proximate to an antenna system, wherein the antenna system does not comprise the access node. For example, it may be detected that wireless device 102 is proximate to antenna system 108. The detection may be based on a signal level metric for wireless device 102, a determined location for wireless device 102, and any other suitable information.

At step 206, it may be determined that carrier aggregation is to be triggered for the wireless device based on the detecting. For example, it may be determined that data is to be transmitted from access node 110 to wireless device 102 on a primary carrier (frequency band) and a secondary carrier (frequency band).

At step 208, carrier aggregation may be performed for the wireless device. For example, based on the determination, access node 110 may transmit data to wireless device 102 on a primary carrier and a secondary carrier. In an embodiment, the carrier aggregation may be configured such that the primary carrier and secondary carrier are based on the one or more frequency bands used by antenna system 108 to communicate with participating wireless devices.

Figure 3:
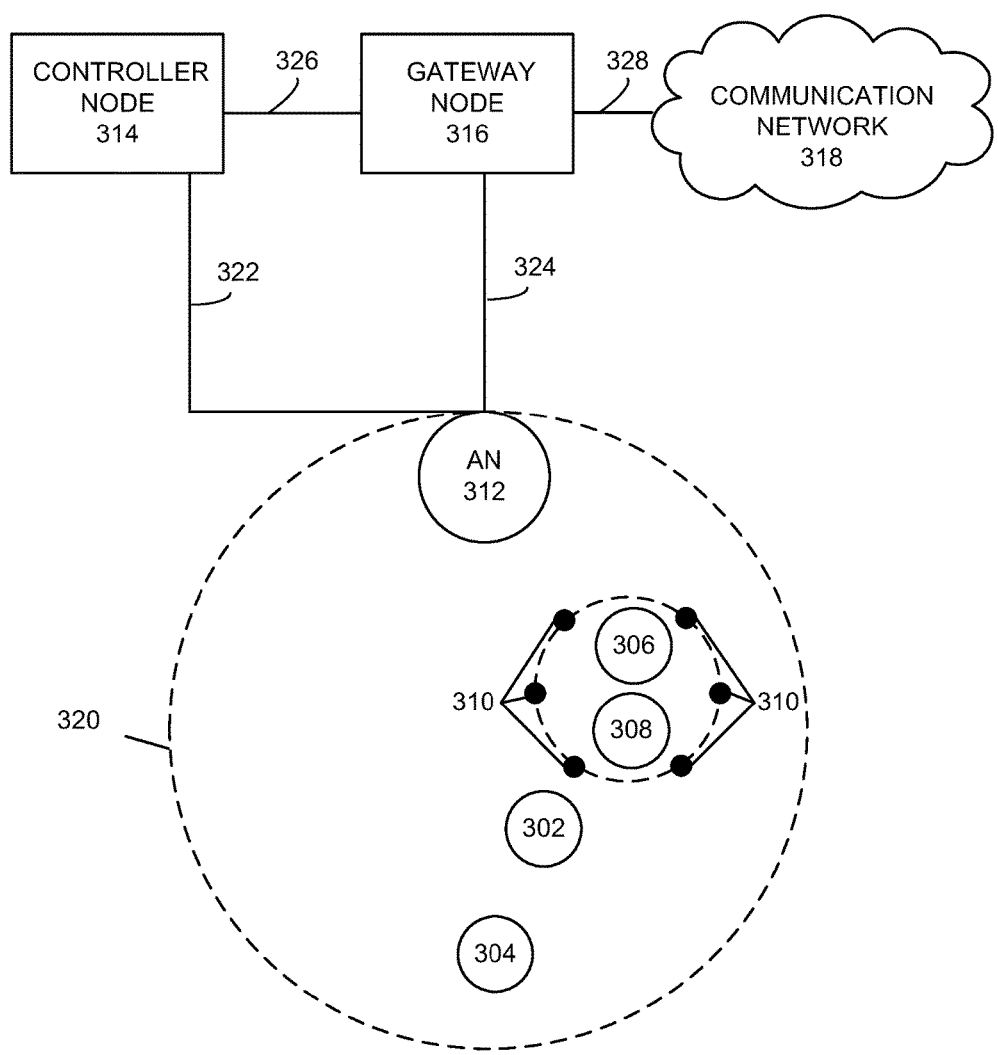
FIG. 3 illustrates another exemplary communication system to perform carrier aggregation for a wireless device proximate to an antenna system.

FIG. 3 illustrates another exemplary communication system 300 to perform carrier aggregation for a wireless device proximate to an antenna system. Communication system 300 may comprise wireless devices 302, 304, 306, and 308, antenna system 310, access node 312, controller node 314, gateway node 316, communication network 318, coverage area 320, and communication links 322, 324, 326, and 328. Other network elements may be present in the communication system 300 to facilitate communication but are omitted for clarity, such as base stations, base station controllers, gateways, mobile switching centers, dispatch application processors, and location registers such as a home location register or visitor location register.

Wireless devices 302, 304, 306, and 308 can be any device configured to communicate over communication system 300 using a wireless communication link. For example, wireless device 302, 304, 306, and 308 can include a cell phone, a smart phone, a computing platform such as a laptop, palmtop, or a tablet, a personal digital assistant, relay communication device, or an internet access device, and combinations thereof.

Antenna system 310 may comprise any configuration of antennas or access points configured to provide wireless devices (e.g., wireless devices 306 and 308) access to a communication network (e.g., communication network 318) within a geographic area. For example, antenna system 310 may comprise a distributed antenna system (DAS) or any other suitable configured antenna system or array distributed across a predetermined geographic space. In some embodiments, antenna system 310 may comprise one or more filters (e.g., low pass filters), one or more repeaters, one or more amplifiers, and any other suitable components.

Access nodes 312 is a network node capable of providing wireless communication to wireless devices 302 and 304, and can be, for example, a base transceiver station, a radio base station, an eNodeB device, a small cell (i.e. pico node, femto node, and the like), or any other suitable network element. In an embodiment, access node 312 can comprise a serving access node for wireless device 302. Access node 312 may communicate with controller node 314 over communication link 324, and with gateway node 316 over communication links 326. Although only one access node and antenna system are illustrated in FIG. 3, wireless 302, 304, 306, and 308 (and other wireless device not depicted) can be in communication with a plurality of access nodes and/or small cells. The plurality of access nodes and/or small cells can be associated with different networks and can support different communication protocols and radio access technologies.

Controller node 314 can be any network node configured to manage services within system 300. Controller node 314 may provide other control and management functions for system 300. The controller node 314 can be a single device having various functions or a plurality of devices having differing functions. For example, controller node 314 can include at least one of a multi-cell/multicast coordination entity (MCE), a mobility management entity (MME), a radio network controller (RNC), a mobile switching center (MSC), and a combination thereof.

Controller node 314 can comprise a processor and associated circuitry to execute or direct the execution of computer-readable instructions to obtain information. Controller node 314 can retrieve and execute software from storage, which can include a disk drive, a flash drive, memory circuitry, or some other memory device, and which can be local or remotely accessible. The software may comprise computer programs, firmware, or some other form of machine-readable instructions, and may include an operating system, utilities, drivers, network interfaces, applications, or some other type of software, including combinations thereof. Controller node 314 can receive instructions and other input at a user interface. Controller node 314 can comprise a processor and associated circuitry to execute or direct the execution of computer-readable instructions to obtain information.

Gateway node 316 is a network element which can comprise a processor and associated circuitry to execute or direct the execution of computer-readable instructions. Gateway node 316 may retrieve and execute software from storage, which can include a disk drive, flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. In an embodiment, gateway node 316 can provide instructions to access node 312 related to channel selection in communications with wireless devices. For example, gateway node 316 can comprise at least one of a serving gateway (SGW), a packet data network gateway (PDNGW), a cellular gateway (CGW), and a combination thereof.

Communication network 318 can be a wired and/or wireless communication network, and can comprise processing nodes, routers, gateways, and physical and/or wireless data links for carrying data among various network elements, including combinations thereof, and can include a local area network, a wide area network, and an internetwork (including the Internet). Communication network 318 may also comprise base stations, wireless communication nodes, telephony switches, internet routers, network gateways, computer systems, communication links, or some other type of communication equipment, and combinations thereof. Wireless network protocols may comprise code division multiple access (CDMA) 1xRTT, Global System for Mobile communications (GSM), Universal Mobile Telecommunications System (UMTS), High-Speed Packet Access (HSPA), Evolution Data Optimized (EV-DO), EV-DO rev. A, and Third Generation Partnership Project Long Term Evolution (3GPP LTE). Wired network protocols that may be utilized by communication network 318 comprise Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM).

Communication links 322, 324, 326, and 328 can be wired or wireless communication links. Wired communication links can be, for example, twisted pair cable, coaxial cable or fiber optic cable, or combinations thereof. Wireless communication links can be a radio frequency, microwave, infrared, or other similar signal, and can use a suitable communication protocol, for example, Global System for Mobile telecommunications (GSM), Code Division Multiple Access (CDMA), or Long Term Evolution (LTE), or combinations thereof. Other wireless protocols can also be used.

Other network elements may be present in the communication system 300 to facilitate wireless communication but are omitted for clarity, such as base stations, base station controllers, gateways, mobile switching centers, dispatch application processors, and location registers such as a home location register or visitor location register. Furthermore, other network elements may be present to facilitate communication among access node 312, controller node 314, gateway node 316, and communication network 318 which are omitted for clarity, including additional processing nodes, routers, gateways, and physical and/or wireless data links for carrying data among the various network elements. In an embodiment, any of controller node 314, gateway node 316, and one or more modules of access node 312, may perform all or parts of the methods of FIGS. 2, 4, and 5.

In operation, access node 312 may establish communication with wireless devices 302 and 304 such that access node 312 provides the wireless devices access to a communication network (e.g., communication network 318). Similarly, antenna system 310 may establish communication with wireless devices 306 and 308 such that antenna system 310 provides the wireless devices access to a communication network (e.g., communication network 318).

In an embodiment, access node 312 may comprise coverage area 320. For example, a coverage area may be the area around an access node or cell where a wireless device may detect wireless signals transmitted from the node or cell (e.g., detect signals at a signal level above a threshold). Antenna system 310 may overlap with coverage area 320.

In an embodiment, system 300 may use a plurality of carriers in order to provide wireless communication services. For example, a plurality of carriers that comprise bandwidth for wireless communications (e.g., one or more carriers over a 1.25 GHz spectrum, one or more carriers over a 1900 Mhz spectrum, one or more carriers over a 800 Mhz spectrum, and the like) may include a plurality of channels (e.g., 5 Mhz channels, 10 Mhz channels, 15 Mhz channels, and the like) that may further be divided into subcarriers. In an embodiment, a frequency band may comprise a carrier, a channel, a subcarrier, a plurality of any of these, or any other suitable frequency band.

In an embodiment, carrier aggregation may also be implemented by system 300. For example, access node 312 may communicate with wireless device 302 using carrier aggregation such that the data rate (or throughput) for the communication is greater than the data rate for single carrier communication. In an embodiment, access node 312 may communicate with wireless device 302 using a primary carrier (e.g., a first frequency band) and one or more secondary carriers (e.g., one or more secondary frequency bands). For example, a primary channel (e.g., 5 or 10 Mhz channel) and one or more secondary channels may be allocated for communication between access node 312 and wireless device 302, where each channel may comprise a component carrier for the communication.

When using carrier aggregation, the available spectrum for communication, and thus the data rate or throughput, may increase directly with the number of secondary component carriers. The communication may leverage one or more of intra-band carrier aggregation with contiguous component carriers, intra-band carrier aggregation with non-contiguous component carriers, or inter-band carrier aggregation. In some embodiments, wireless device 302 may transmit uplink communications on the primary component carrier, but not on the secondary component carrier. In other embodiments, wireless device 302 may transmit uplink communications on both the primary and secondary component carriers.

In an embodiment, communication between wireless device 302 and access node 312 may cause interference at antenna system 310. In some embodiments, it may be a given that wireless devices 306 and 308, wireless devices served by antenna system 310 (e.g., participating wireless devices), are within a predetermined geographic area (e.g., a predetermined geographic area covered by antenna system 310). In this example, the uplink transmit power for the participating wireless devices (may be controlled in view of the known locations for the antennas distributed across the geographic region. For instance, the participating wireless device may be instructed to use an uplink transmit power that is lower than the power used for normal communication with an access node.

In an embodiment, communication between access node 312 and wireless device 302 (e.g., non-participating wireless device) may interfere with communication between antenna system 310 and the participating wireless devices. For example, the uplink transmit power for wireless device 302 may not be controlled in the manner that the uplink transmit power for the participating wireless devices are controlled, and thus uplink transmission from wireless device 302 may overload antenna system 310. On the other hand, wireless device 304 may also be in communication with access node 312 and may also comprise a non-participant wireless device. However, wireless device 304 may not be proximate to the antenna system, and thus may not cause interference at antenna system 310. Accordingly, it may be beneficial for a system to mitigate interference experienced at an antenna system caused by proximate wireless devices.

Figure 4:
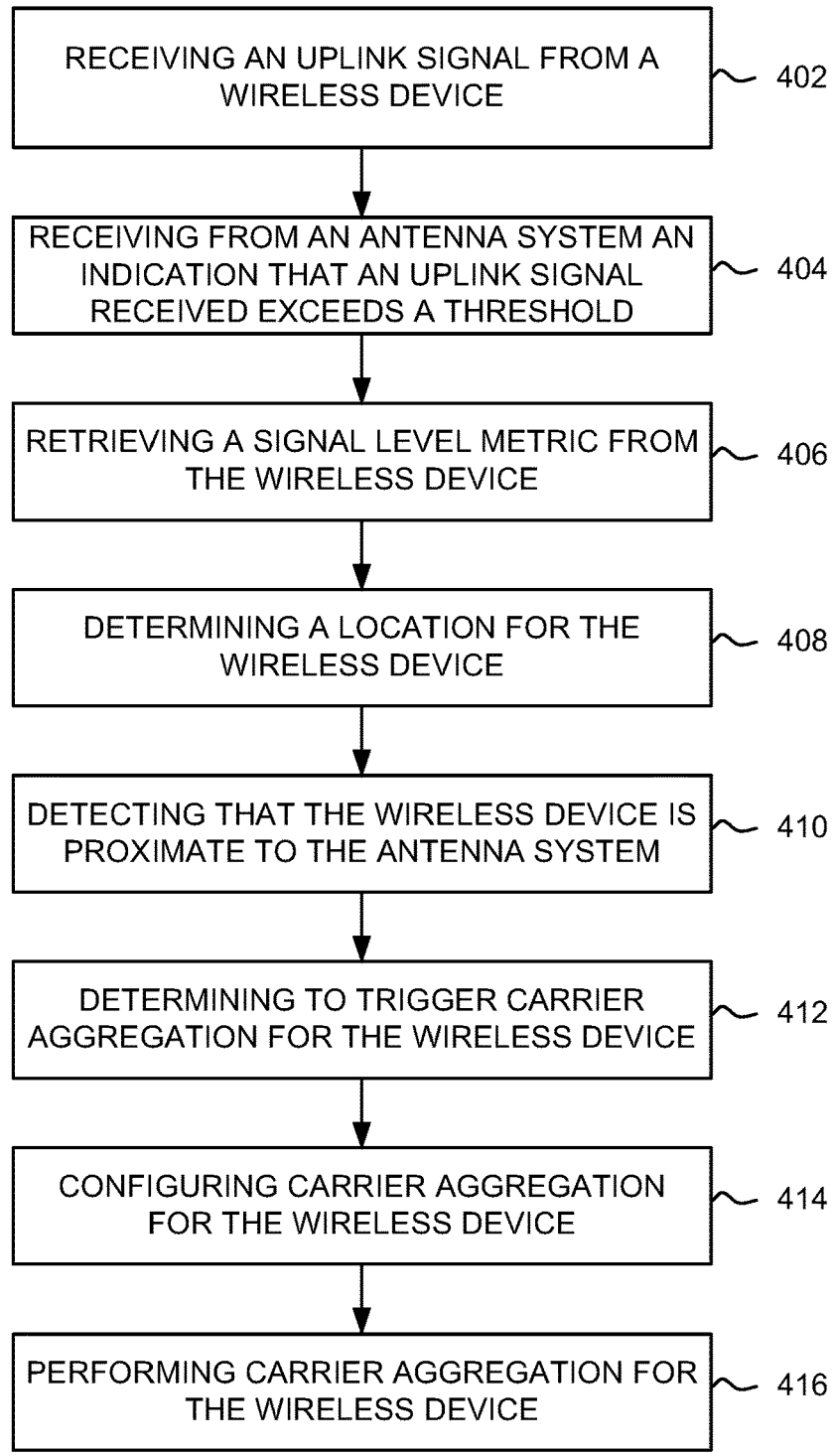
FIG. 4 illustrates another exemplary method for performing carrier aggregation for a wireless device proximate to an antenna system.

FIG. 4 illustrates an exemplary method for performing carrier aggregation for a wireless device proximate to an antenna system according to an embodiment. The method will be discussed with reference to the exemplary communication system 100 illustrated in FIG. 3, however, the method can be implemented with any suitable communication system.

Referring to FIG. 4, at step 402, an uplink signal may be received at an access node from a wireless device in communication with the access node. For example, access node 312 may be in communication with wireless device 302. Wireless device 302 may receive downlink transmissions from access node 312 and access node 312 may receive uplink transmissions from wireless device 302.

At step 404, an indication may be received from the antenna system that indicates uplink signals received at the antenna system exceed a signal level threshold. For example, antenna system 310 may communicate with wireless devices 306 and 308 (e.g., participating wireless devices). The antenna system may be configured such that an uplink power for the wireless devices communicating over the antenna system is controlled. For example, antenna system 310 may comprise a conventional distributed antenna system (DAS).

In an embodiment, antenna system 310 may instruct participating wireless devices to communicate with the antenna system using a predetermined uplink power level. Based on the known geographic space and distances for the antenna system, and the known presence of antennas across the geographic space, it may be a given that a certain uplink power level may be sufficient for participating wireless devices to communicate with antenna system 310. Accordingly, the predetermined uplink power level may be calculated such that it is sufficient for participating wireless devices to communicate with antenna system 310 while they are located in the designated geographical space. In an embodiment, the antenna system may also implement a predetermined downlink power level based on the known conditions discussed herein for communication with participating wireless devices.

In an embodiment, the predetermined uplink power level may be less than a power level used by a wireless device when communicating with an access node that is not part of antenna system 310 (e.g., less than an uplink power level used by wireless device 302 to communicate with access node 312). For instance, because the communication between wireless device 302 and access node 312 does not benefit from the same known parameters (e.g., known geographical space and known antennas across the geographical space) the uplink power used by wireless device 302 may be greater than the uplink power used by the participating wireless device. In an embodiment, an implemented predetermined downlink power level for antenna system 310 may similarly be less than the implemented downlink power level used by an access node to communicate with wireless devices (e.g., used by access node 312 to communicate with wireless device 302).

In some embodiments, a signal received by an antenna of antenna system 310 may exceed a signal level threshold for the antenna system. For example, based on the predetermined uplink power level (and/or predetermined downlink power level), a signal level threshold may be set for received signals at antenna system 310. The signal level threshold may be set by a network administrator, or may be dynamic based on the configuration of wireless devices within the geographic area designated for antenna system 310. In an embodiment, a signal received at antenna system 310 may exceed such a threshold, for instance an uplink signal received from wireless device 302 when the wireless device is communicating with access node 312. In other embodiments, the received signal may be from some other source. Antenna system 310 may communicate with access node 312 to indicate that such a signal has been received.

In an embodiment, when antenna system 310 receives a signal that is greater than the threshold, the system may implement automatic gain control (AGC). For example, antenna system 310 may comprise a DAS that implements AGC when a signal is received that exceeds a predetermined threshold to maintain system performance for participating wireless devices (e.g., mitigate service degradation in view of the received signal). For instance, AGC can be used to lower the power of the received signal that exceeds the signal level threshold and thus mitigate against service degradation. However, when implemented, AGC can affect both the received power for signals from the non-participant wireless device (e.g., wireless device 302) and the participant wireless devices (e.g., wireless devices 306, and 308). Accordingly, a non-participant wireless device triggering AGC at antenna system 310 can reduce the quality of wireless services for participant wireless devices. In an embodiment, the indication from antenna system 310 may comprise an indication that AGC has been triggered at the antenna system.

In an embodiment, antenna system 310 may transmit the indication to access nodes proximate to the antenna system. For instance, antenna system 310 may manage a neighbor list, similar to a neighbor list that is maintained at access nodes (e.g., (neighbor relations table (NRT)). In an embodiment, the neighbor list may be populated by a network administrator, based on an automatic neighbor relations (ANR) protocol that leverages wireless devices in communication with antenna system 310, or in any other suitable manner. In an embodiment, antenna system 310 may transmit an indication that indicates uplink signals received at the antenna system exceed a signal level threshold to neighbors of the antenna system (e.g., access nodes determined to be proximate to the antenna system based on their inclusion on a neighbor list for the antenna system). In an embodiment, the indication may comprise a message, or any other suitable indication.

At step 406, a signal level metric for the wireless device may be retrieved. For example, when communicating with access node 312, wireless device 302 may comprise a signal level metric. The signal level metric may comprise a received signal level metric for a signal received from access node 312 (e.g., received signal to noise plus interference ratio (SINR), received signal strength indicator (RSSI), reference signal received quality (RSRQ), received signal received power (RSRP), and the like) channel quality indicator (CQI), or any other suitable signal level metric. In an embodiment, the retrieved signal level metric may be used to determine whether carrier aggregation is to be performed for wireless device 302.

At step 408, a location may be determined for the wireless device. For example, a location for wireless device 302 may be determined. The wireless device may communicate with a GPS system, and the GPS system may be used to determine the location. In another embodiment, signal triangulation may be used to determine a location. For example, a wireless device may receive signals from a plurality of access nodes (e.g. reference signals) or from the antenna system 310 at different signal levels. Based on the received signal levels, a distance from each access node or the antenna system may be determined. Accordingly, using the determined distances from each access node or the antenna system, a location may be determined for the wireless device. A location may also be determined in any other suitable manner. In an embodiment, the determined location may be used to determine whether carrier aggregation is to be performed for wireless device 302.

At step 410, it may be detected that the wireless device is proximate to an antenna system, wherein the antenna system does not comprise the access node. For example, it may be detected that wireless device 302 is proximate to antenna system 310, where wireless device 302 is in communication with access node 312 and antenna system 310 does not comprise access node 312 (e.g., access node 312 is not a part of antenna system 310). The detection may be based on an indication received from antenna system 310, a signal level metric for wireless device 302, a determined location for wireless device 302, and any other suitable information. In another embodiment, the detection that wireless device 302 is proximate to antenna system 310 may further indicate that wireless device 302 is within a threshold distance from antenna system 310, that wireless device 302 is within a threshold distance from (or proximate to) a geographical space associated with antenna system 310, or may indicate any other suitable proximity between wireless device 302 and antenna system 310.

In an embodiment, an indication may be received from antenna system 310 that indicates uplink signals received at the antenna system exceed a signal level threshold. For example, one or more antenna of antenna system 310 may receive signals from one or more sources (e.g., wireless device 302) that exceed a predetermined threshold for a received signal level. In an embodiment, it may be detected that wireless device 302 is proximate to antenna system 310 based on the received indication from antenna system 310. For example, based on known location for access node 312 and antenna system 310, it may be determined that a wireless device in communication with access node 312 is a source of signals received at antenna system 310 that exceed the predetermined threshold.

In an embodiment, a signal level metric for wireless device 302 may be retrieved. For example, the signal level metric may comprise a received signal level metric for a signal received from access node 312, a CQI, or the like. The retrieved signal level metric may be compared to a signal level metric criteria. For example, the signal level metric criteria may comprise a predetermined signal level metric value or range of values (e.g., SINR or CQI value or range of values), wherein comparison with the criteria indicates that wireless device 302 is proximate to antenna system 310. In an embodiment, it may be detected that wireless device 302 is proximate to antenna system 310 based on the retrieved signal level metric and the received indication from antenna system 310.

For example, based on known location for access node 312 and antenna system 310, it may be determined that a wireless device in communication with access node 312 is a source of signals received at antenna system 310 that exceed the predetermined threshold. In addition, based on the retrieved signal level metric for wireless device 302, it may be determined that wireless device 302 is the particular wireless device (or one of the particular wireless devices) in communication access node 312 that is the source of the received signals at antenna system 310 that exceed the predetermined threshold.

In another embodiment, it may be detected that wireless device 302 is proximate to antenna system 310 based on the retrieved signal level metric, a sector or carrier of access node 312 that is in communication with wireless device 302, and the received indication from antenna system 310. For example, access node 312 may be divided into one or more sectors, for instance three sectors that comprise 120° arcs of coverage area 320. A predetermined sector of access node 312 may comprise coverage that overlaps with antenna system 310. Accordingly, it may be detected that wireless device 302 is proximate to antenna system 310 when wireless device 302 is served by a predetermined sector of access node 312.

In an embodiment, access node 312 may comprise a number of carriers. For example, a first carrier used by access node 312 to provide wireless services may comprise a first coverage area and a second carrier used by access node 312 to provide wireless services may comprise a second coverage area, where the first coverage area is different in size from the second coverage area. In an embodiment, depending on the carrier used by wireless device 302 to communicate with access node 312, the wireless device may be detected to be proximate to antenna system 310.

For example, the signal level metric criteria that may comprise a predetermined signal level metric value or range of values (e.g., SINR or CQI value or range of values) may be based on the carrier used to communicate with wireless device 302. For example, a first value or range of values may indicate that a wireless device communicating over a first carrier is proximate to antenna system 310 and a second value or range of values may indicate that a wireless device communicating over a second carrier is proximate to antenna system 310. Accordingly, the comparison between predetermined signal level metric and the retrieved signal level metric may be based on the carrier used by wireless device 302 to communicate with access node 310. In an embodiment, it may be detected that wireless device 302 is proximate to antenna system 310 based on a comparison between the signal level metric and the signal level metric criteria, the signal level metric criteria being based on a carrier used by wireless device 302 to communicate with access node 312.

In an embodiment, a location for wireless device 302 may be determined. For example, the location may be determined based on GPS, signal triangulation, or in any other suitable manner. In an embodiment, a predetermined location for antenna system 310 may be compared to the determined location for wireless device 302, and it may be detected that wireless device 302 is proximate to antenna system 310 based on the comparison.

At step 412, it may be determined that carrier aggregation is to be triggered for the wireless device based on the detecting. For example, it may be determined that access node 312 will perform carrier aggregation by transmitting data over a primary carrier and a secondary carrier to wireless device 302.

In an embodiment, it may be determined that carrier aggregation is to be triggered for wireless device 302 when a retrieved signal level metric for wireless device 302 meets a criteria. In an embodiment, a signal level metric for wireless device 302 may be retrieved. For example, the signal level metric may comprise a received signal level metric for a signal received from access node 312, a CQI, or the like. The retrieved signal level metric may be compared to a criteria. For example, the criteria may comprise a predetermined signal level metric value or range of values (e.g., SINR or CQI value or range of values), wherein comparison with the criteria indicates that uplink transmissions from wireless device 302 are capable of interfering with communication at antenna system 310.

In an embodiment, it may be determined that that carrier aggregation is to be triggered for wireless device 302 when an uplink transmit power for wireless device 302 meets a transmit power criteria. For example, access node 312 may instruct wireless device 302 to transmit uplink transmissions with a predetermined power level (e.g., based on a signal level metric for the wireless device). The predetermined power level may be compared to a criteria. For example, the criteria may comprise a power level value or range of values (e.g., SINR or CQI value or range of values), wherein comparison with the criteria indicates that uplink transmissions from wireless device 302 are capable of interfering with communication at antenna system 310.

At step 414, carrier aggregation for the wireless device may be configured. For example, the carrier aggregation for wireless device 302 performed at access node 312 may be configured. In an embodiment, configuring the carrier aggregation may comprise selecting a frequency band to serve as a primary carrier and a frequency band to serve as a secondary carrier. In other examples, the carrier aggregation may comprise multiple secondary carriers.

In an embodiment, one or more carriers used by antenna system 310 to communicate with participant wireless devices may be determined, and the carrier aggregation may be configured based on the determining. For example, a plurality of frequency bands may be available for communication between wireless devices and access node 312. In addition, antenna system 310 may use one or more frequency bands to communicate with participant wireless devices. In some embodiments, the available frequency bands for communication at access node 312 are greater in number than the frequency bands used by antenna system 310 to communicate with participant wireless devices.

In an embodiment, a frequency band from among the available frequency bands may be selected as the primary carrier, where the selected frequency band is other than one of the determined frequency bands used by antenna system 310 to communicate with participant wireless devices. In an example, wireless device 302 may be instructed to transmit uplink signals over the primary carrier, but not a secondary carrier. Accordingly, selecting a frequency band that is not used by antenna system 310 to communicate with participating wireless devices as the primary carrier may mitigate interference caused by uplink signals transmitted by wireless device 302.

In an embodiment, a frequency band from among the available frequency bands may also be selected as the secondary carrier, where the selected frequency band is other than one of the determined frequency bands used by antenna system 310 to communicate with participant wireless devices. In other examples, the selected secondary carrier may be used by antenna system 310 to communicate with participant wireless devices. In some embodiments, the selection of the primary carrier and secondary carrier may also be based on a utilization for the carriers, a determined location for wireless device 302, a quality of service class identifier (QCI) for wireless device 302, any other application requirements for wireless device 302, and other suitable factors.

In an embodiment, determining the one or more carriers used by antenna system 310 to communicate with participant wireless devices may comprise retrieving the carrier information from antenna system 310. For example, access node 312 may transmit a request for the carrier information, and antenna system 310 may reply with the implemented carriers. In another embodiment, the carrier information for antenna system 310 may be stored at a separate network element (e.g., controller node 314) and access node 312 may retrieve the information from the separate network element. In another embodiment, access node 312 may store the carrier information (e.g., in a neighbor relations table) and the information may be retrieved from storage.

At step 416, carrier aggregation may be performed for the wireless device by transmitting data from the access node to the wireless device over a primary carrier and a secondary carrier. For example, based on the determination, access node 312 may transmit data over a primary carrier and secondary carrier to wireless device 302.

In an embodiment, based on the configuration for the carrier aggregation, wireless device 302 may be instructed to change the frequency band used by the wireless device to communicate with access node 312. In some examples, wireless device 302 may be instructed to change from a frequency band used by antenna system 310 to communicate with participants wireless devices to a new frequency band not used by antenna system 310, where the wireless device is also instructed to transmit uplink signals on the new frequency band.

In an embodiment, a scheduler at access node 312 may schedule resource block transmissions to wireless device 302. For example, the scheduler may schedule one or more downlink transmissions to wireless device 302 on the primary carrier and one or more resource block transmissions to wireless device 302 on the secondary carrier. In an embodiment, the primary carrier is scheduled a greater number of resource block transmissions than the secondary carrier when antenna system 310 communicates with participant wireless devices over the secondary carrier. For example, the primary carrier may be selected because antenna system 310 does not use the selected carrier for communication with wireless devices. Scheduling a larger number of downlink transmissions on the primary carrier may further reduce the interference experienced at antenna system 310.

In an embodiment, access node 312 may continue to perform carrier aggregation for wireless device 302 until the wireless device is no longer proximate to antenna system 310, the wireless device is handed over from access node 312, or the wireless device begins communicating with antenna system 310.

Figure 5:
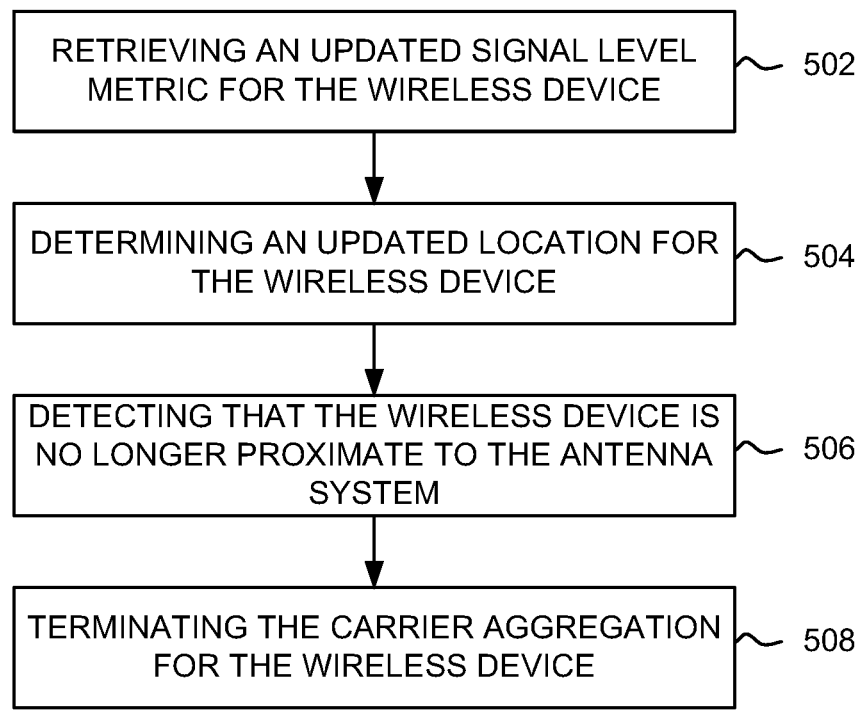
FIG. 5 illustrates an exemplary method for terminating carrier aggregation for a wireless device proximate to an antenna system.

FIG. 5 illustrates an exemplary method for terminating carrier aggregation for a wireless device according to an embodiment. The method of FIG. 5 may be performed in combination with or after performance of the method of FIG. 4. The method will be discussed with reference to the exemplary communication system 300 illustrated in FIG. 3, however, the method can be implemented with any suitable communication system.

Referring to FIG. 5, at step 502, an updated signal level metric for the wireless device may be retrieved. For example, the updated signal level metric for wireless device 302 may comprise a received signal level metric for a signal received from access node 312, a CQI, or the like. In an embodiment, the updated signal level metric may be retrieved after access node 312 triggers carrier aggregation for wireless device 302.

At step 504, an updated location may be determined for the wireless device. For example, an updated location may be determined for wireless device 302. In an embodiment, the updated location may be determined based on GPS, signal triangulation, or in any other suitable manner.

At step 506, it may be detected that the wireless device is no longer proximate to the antenna system. For example, it may be determined that wireless device 302 is no longer proximate to antenna system 310.

In an embodiment, the updated signal level metric may be compared to a signal level metric criteria. For example, the signal level metric criteria may comprise a predetermined signal level metric value or range of values (e.g., SINR or CQI value or range of values), wherein comparison with the criteria indicates whether wireless device 302 is proximate to antenna system 310. In an embodiment, it may be detected that wireless device 302 is no longer proximate to antenna system 310 based on the updated signal level metric.

In an embodiment, it may be detected that wireless device 302 is no longer proximate to antenna system 310 based on the updated signal level metric and a sector or carrier of access node 312 that is in communication with wireless device 302. For example, access node 312 may be divided into one or more sectors, for instance three sectors that comprise 120° arcs of coverage area 320. A predetermined sector of access node 312 may comprise coverage that overlaps with antenna system 310 while other sectors of access node 312 do not overlap with antenna system 310. Accordingly, it may be detected that wireless device 302 is no longer proximate to antenna system 310 when wireless device 302 is served by a sector of access node 312 other than the predetermined sector.

In an embodiment, access node 312 may comprise a number of carriers. For example, a first carrier used by access node 312 to provide wireless services may comprise a first coverage area and a second carrier used by access node 312 to provide wireless services may comprise a second coverage area, where the first coverage area is different in size from the second coverage area. In an embodiment, depending on the carrier used by wireless device 302 to communicate with access node 312, the wireless device may be detected to be proximate to antenna system 310.

For example, the signal level metric criteria that comprises a predetermined signal level metric value or range of values (e.g., SINR or CQI value or range of values) may be based on the carrier used to communicate with wireless device 302. For example, a first value or range of values may indicate that a wireless device communicating over a first carrier is proximate to the antenna system 310 and a second value or range of values may indicate that a wireless device communicating over a second carrier is proximate to the antenna system 310. Accordingly, the comparison between predetermined signal level metric and the updated signal level metric may be based on the carrier used by wireless device 302 to communicate with access node 310. In an embodiment, it may be detected that wireless device 302 is no longer proximate to antenna system 310 based on a comparison between the updated signal level metric and the signal level metric criteria, the signal level metric criteria being based on a carrier used by wireless device 302 to communicate with access node 312.

In an embodiment, an updated location for wireless device 302 may be determined. For example, the updated location may be determined based on GPS, signal triangulation, or in any other suitable manner. In an embodiment, a predetermined location for antenna system 310 may be compared to the updated location for wireless device 302, and it may be detected that wireless device 302 is no longer proximate to antenna system 310 based on the comparison.

At step 508, the carrier aggregation for the wireless device may be terminated. For example, based on the detection, access node 312 may terminate the carrier aggregation for wireless device 302.

In an embodiment, based on the detection that wireless device 302 is no longer proximate to antenna system 310, it may be determined that wireless device 302 will no longer transmit uplink signals that interfere with antenna system 310 when carrier aggregation is terminated.

Although the methods described perform steps in a particular order for purposes of illustration, the methods discussed herein are not limited to any particular order or arrangement. One skilled in the art, using the disclosure provided herein, will appreciate that various steps of the methods can be omitted, rearranged, combined, and/or adapted in various ways.

Figure 6:
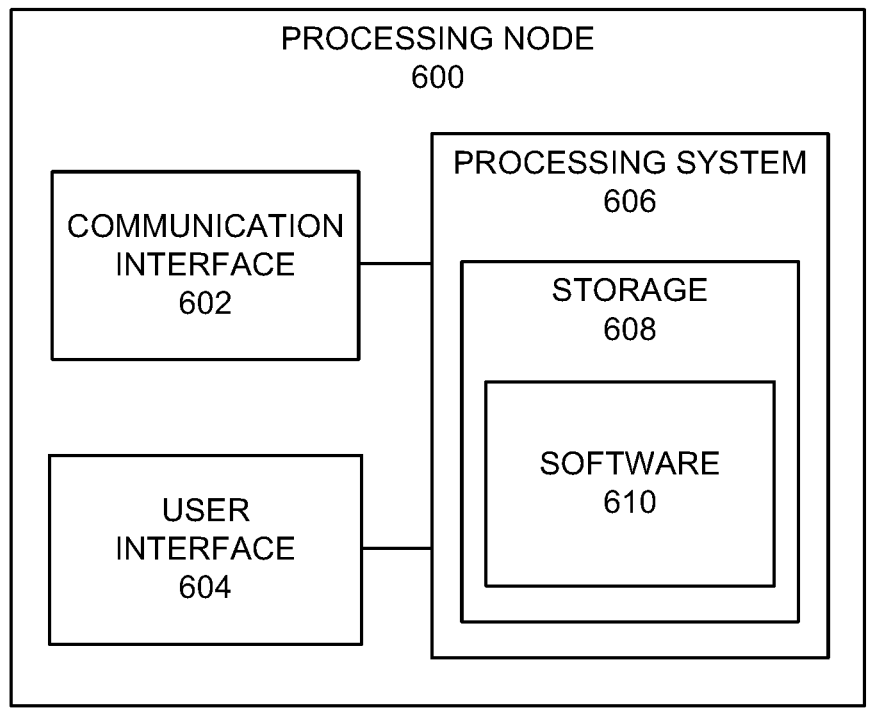
FIG. 6 illustrates an exemplary processing node.

FIG. 6 illustrates an exemplary processing node 600 in a communication system. Processing node 600 comprises communication interface 602, user interface 604, and processing system 606 in communication with communication interface 602 and user interface 604. Processing node 600 can be configured to determine a communication access node for a wireless device. Processing system 606 includes storage 608, which can comprise a disk drive, flash drive, memory circuitry, or other memory device. Storage 608 can store software 610 which is used in the operation of the processing node 600. Storage 608 may include a disk drive, flash drive, data storage circuitry, or some other memory apparatus. Software 610 may include computer programs, firmware, or some other form of machine-readable instructions, including an operating system, utilities, drivers, network interfaces, applications, or some other type of software. Processing system 606 may include a microprocessor and other circuitry to retrieve and execute software 610 from storage 608. Processing node 600 may further include other components such as a power management unit, a control interface unit, etc., which are omitted for clarity. Communication interface 602 permits processing node 600 to communicate with other network elements. User interface 604 permits the configuration and control of the operation of processing node 600.

Examples of processing node 600 include controller node 314 and gateway node 316. Processing node 600 can also be an adjunct or component of a network element, such as an element of access node 110, access node 312, and the like. Processing node 600 can also be another network element in a communication system. Further, the functionality of processing node 600 can be distributed over two or more network elements of a communication system.

The exemplary systems and methods described herein can be performed under the control of a processing system executing computer-readable codes embodied on a computer-readable recording medium or communication signals transmitted through a transitory medium. The computer-readable recording medium is any data storage device that can store data readable by a processing system, and includes both volatile and nonvolatile media, removable and non-removable media, and contemplates media readable by a database, a computer, and various other network devices.

Examples of the computer-readable recording medium include, but are not limited to, read-only memory (ROM), random-access memory (RAM), erasable electrically programmable ROM (EEPROM), flash memory or other memory technology, holographic media or other optical disc storage, magnetic storage including magnetic tape and magnetic disk, and solid state storage devices. The computer-readable recording medium can also be distributed over network-coupled computer systems so that the computer-readable code is stored and executed in a distributed fashion. The communication signals transmitted through a transitory medium may include, for example, modulated signals transmitted through wired or wireless transmission paths.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention, and that various modifications may be made to the configuration and methodology of the exemplary embodiments disclosed herein without departing from the scope of the present teachings. Those skilled in the art also will appreciate that various features disclosed with respect to one exemplary embodiment herein may be used in combination with other exemplary embodiments with appropriate modifications, even if such combinations are not explicitly disclosed herein. As a result, the invention is not limited to the specific embodiments described above, but only by the following claims and their equivalents.

What is claimed is:

1. A method for performing carrier aggregation for a wireless device proximate to an antenna system, the method comprising:
receiving an uplink signal at an access node from a wireless device in communication with the access node;
detecting that the wireless device is proximate to an antenna system, is a non-participant wireless device of the antenna system and has an uplink transmit power meeting a transmit power criteria, wherein the antenna system does not comprise the access node;
determining to trigger carrier aggregation for the wireless device based on the detecting; and
performing carrier aggregation for the wireless device by transmitting data from the access node to the wireless device on at least a primary carrier and secondary carrier.

2. A method of claim 1, wherein,
the antenna system is in communication with a plurality of participant wireless devices, and
the uplink transmit power for the non-participant wireless device used to transmit the uplink signal received at the access node is greater than an uplink transmit power for the participant wireless devices.

3. A method of claim 2, further comprising determining to trigger carrier aggregation for the non-participant wireless device when a signal level metric for the non-participant wireless device meets a signal level criteria.

4. A method of claim 2, further comprising:
determining one or more carriers used by the antenna system to communicate with participant wireless devices;
configuring the carrier aggregation based on the determined one or more carriers.

5. A method of claim 4, wherein configuring the carrier aggregation further comprises selecting a carrier other than the determined one or more carriers used by the antenna system as a primary carrier for the configured carrier aggregation.

6. A method of claim 5, further comprising:
scheduling resource block transmissions for the wireless device over the primary carrier and secondary carrier, wherein the primary carrier is scheduled a greater number of resource block transmissions than the secondary carrier when the antenna system communicates with participant wireless devices over the secondary carrier.

7. A method of claim 1, wherein detecting that the wireless device is proximate to the antenna system further comprises:
receiving an indication from the antenna system that indicates uplink signals received at the antenna system exceed a signal level threshold;
retrieving signal level metric for the wireless device; and
detecting that the wireless device is proximate to the antenna system based on the received indication and the retrieved signal level metric.

8. A method of claim 1, wherein detecting that the wireless device is proximate to the antenna system further comprises:
determining a location for the wireless device based on signals received at the wireless device; and
detecting that the wireless device is proximate to the antenna system based on the determined location.

9. A method of claim 1, further comprising:
detecting, after performing carrier aggregation for the wireless device, that the wireless device is no longer proximate to the antenna system; and
terminating the carrier aggregation for the wireless device.

10. A method of claim 9, wherein detecting that the wireless device is no longer proximate to the antenna system further comprises:
retrieving an updated signal level metric for the wireless device; and
detecting that the wireless device is no longer proximate to the antenna system based on the retrieved updated signal level metric.

11. A method of claim 9, wherein detecting that the wireless device is no longer proximate to the antenna system further comprises:
determining an updated location for the wireless device based on signals received at the wireless device; and
detecting that the wireless device is no longer proximate to the antenna system based on the determined updated location.

12. A method of claim 1, wherein the antenna system comprises a distributed antenna system and the access node comprises a macro access node.

13. A system for performing carrier aggregation for a wireless device proximate to an antenna system, the system comprising:
an access node with a processor configured to:
receive an uplink signal from a wireless device in communication with the access node;
detect that the wireless device is proximate to an antenna system, is a non-participant wireless device of the antenna system and has an uplink transmit power meeting a transmit power criteria, wherein the antenna system does not comprise the access node;
determine to trigger carrier aggregation for the wireless device based on the detecting; and
perform carrier aggregation for the wireless device by transmitting data from the access node to the wireless device on at least a primary carrier and secondary carrier.

14. A system of claim 13, wherein,
the antenna system is in communication with a plurality of participant wireless devices, and
the uplink transmit power for the non-participant wireless devices is greater than an uplink transmit power for the participant wireless devices.

15. A system of claim 14, wherein the access node is further configured to determine to trigger carrier aggregation for the non-participant wireless device when a signal level metric for the non-participant wireless device meets a signal level criteria.

16. A system of claim 14, wherein the access node is further configured to:
determine one or more carriers used by the antenna system to communicate with participant wireless devices;
configure the carrier aggregation based on the determined one or more carriers.

17. A system of claim 16, wherein configuring the carrier aggregation further comprises selecting a carrier other than the determined one or more carriers used by the antenna system as a primary carrier for the configured carrier aggregation.

18. A system of claim 17, wherein the access node is further configured to schedule resource block transmissions for the wireless device over the primary carrier and secondary carrier, wherein the primary carrier is scheduled a greater number of resource block transmissions than the secondary carrier when the antenna system communicates with participant wireless devices over the secondary carrier.

* * * * *